US005960428A

United States Patent [19]
Lindsay et al.

[11] Patent Number: 5,960,428
[45] Date of Patent: Sep. 28, 1999

[54] STAR/JOIN QUERY OPTIMIZATION

[75] Inventors: Bruce Gilbert Lindsay; Guy Maring Lohman; Mir Hamid Pirahesh; Eugene Jon Shekita; David Everett Simmen, all of San Jose; Monica Sachiye Urata, Saratoga, all of Calif.

[73] Assignee: International Business Machines Corporation, Armonk, N.Y.

[21] Appl. No.: 08/919,739

[22] Filed: Aug. 28, 1997

[51] Int. Cl.[6] .................................................. G06F 17/30
[52] U.S. Cl. ....................................... 707/4; 707/2; 707/3
[58] Field of Search ........................................ 707/2, 4, 3

[56] References Cited

U.S. PATENT DOCUMENTS

| | | | |
|---|---|---|---|
| 5,091,852 | 2/1992 | Tsuchida et al. | 707/2 |
| 5,297,280 | 3/1994 | Potts, Sr. et al. | 707/3 |
| 5,345,585 | 9/1994 | Iyer et al. | 707/2 |
| 5,530,939 | 6/1996 | Mansfield, Jr. et al. | 707/4 |
| 5,671,403 | 9/1997 | Shekita et al. | 707/3 |
| 5,694,591 | 12/1997 | Du et al. | 707/2 |
| 5,797,000 | 8/1998 | Bhattacharya et al. | 707/2 |
| 5,799,309 | 8/1998 | Srinivasan | 707/102 |
| 5,806,059 | 9/1998 | Tsuchida et al. | 707/2 |
| 5,822,749 | 10/1998 | Agrawal | 707/2 |
| 5,848,408 | 12/1998 | Jakobson et al. | 707/3 |
| 5,864,842 | 1/1999 | Pederson et al. | 707/3 |

OTHER PUBLICATIONS

DeWitt et al, The Gamma Database Machine Project, IEEE Transactions on Knowledge and Data Engineering. vol. 2. No. 1, pp. 44–62, Mar. 1990.

O'Neil et al., Multi–Table Joins Through Bitmapped Join Incides, *SIGMOD Record*, vol. 24, No. 3, Sep. 1995, pp. 8–11.

Sellenger et al., "Access Path Selection in a Relational Database Management System", *Proceedings of the ACM SIGMOD Conference*, Jun. 1979.

B. H. Bloom, "Space/Time Trade–Offs in Hash Coding with Allowable Errors", *Comm. ACM* 13, 7 (Jul. 1970), pp. 422–426.

J. L. Carter et al., "Universal Classes of Hash Functions", *Journal of Computer and System Sciences*, vol. 18, No. 2, (Apr. 1979), pp. 143–154.

*Primary Examiner*—Thomas G. Black
*Assistant Examiner*—Frantz Coby
*Attorney, Agent, or Firm*—Gray Cary Ware Freidenrich

[57] ABSTRACT

Unwieldy star/join queries are performed more efficiently using a filtered fact table. Suitable queries include star/join queries with a large fact table joined with multiple subsidiary dimension tables, where indices exist over fact table join columns. The query is analyzed to prepare a query plan for the dimension table accesses. This plan is supplemented by adding nested loop join operations, where the inner table is a dimension table plan and the outer table is an index scan performed over a fact table index of the join column with the dimension table. The plan is also supplemented by filtering records resulting from the nested loop joins using a sequence of dynamic bit vectors, ultimately yielding a list of probable fact table records. The plan is further supplemented by fetching these records to construct a distilled fact which is used, instead of the large original table, to execute the query in considerably less time. If desired, the supplemented query plan and other competing approaches may studied to provide cost estimates, with the least costly approach being actually implemented.

75 Claims, 5 Drawing Sheets

STAR/JOIN QUERY OPTIMIZATION

BACKGROUND OF THE INVENTION

1. Field of the Invention

The present invention relates to the performance of queries in database processing systems. More particularly, the invention concerns a method, article of manufacture, and apparatus to more efficiently evaluate and execute star/join type queries.

2. Description of the Related Art

Relational databases are organized into tables which consist of rows and columns of data. The rows are formally called tuples. A database will typically have many tables and each table will typically have multiple tuples and multiple columns. The tables are typically stored on random access storage devices (DASDs) such as magnetic or optical disk drives. Data may be retrieved from this type of database by a variety of methods. For example, a computer program can extract information from the database without human intervention or a user can interact with a query system program which serves as a front-end to the database.

"Accessing a table" is used in the art to mean reading information from a table. Since the tables are normally stored on DASD, accessing a table requires transferring all or part of the table from DASD into the random access memory (RAM) of the computer system. When information is needed from a plurality of tables, the tables may be joined by the database software or firmware. "Joins" allow additional information to be obtained across tables in a meaningful way. In a simple example, an Employee table lists an employee's department number as '76', but the definition of department '76' requires reference to another table, the Department table, which lists the full department title associated with each department number. In the Department table, the row for department '76' also contains a column with the department title "Information Systems Department." Thus, a user desiring to generate a report containing a list of all employees including their department titles may want to establish a join relationship between the department number column in the Employee table and the department title column in the Department table, so that the employee's department can be printed in a symbolic form instead of the numerical form.

Ways of specifying and performing joins are the subject of substantial effort. Database tables can be very large and processing tables can be expensive in terms of computer resources. Therefore, it is important that methods for joining tables be efficient. In this respect, queries are often "optimized" to improve their efficiency of execution.

One type of query that is especially difficult to optimize and execute efficiently is the "star/join" query. FIG. 1 shows a graphical representation of a typical star/join query 100. The query 100 includes a fact or "base" table 102 and several dimension tables 104–107, where all tables are shown as "nodes". Arcs, such as the arc 110, interconnect the tables and represent join predicates involving columns of the linked tables. The query 100 may also be represented by query statements, as shown in Table 1, below.

TABLE 1

| |
|---|
| select D1.C1, D2.C2, D3.C3, sum (F.M1), max (F.M2) |
| from D1, D2, D3, F |
| where      D1.K1 = F.DIM1 and |
|                D1.A1 = "New Jersey" and |

TABLE 1-continued

| |
|---|
| D2.K2 = F.DIM2 and |
| D2.A2 = "45" and |
| D3.K3 = F.DIM3 and |
| D3.A3 = "1995" |

The typically huge size of the fact table is one reason that star/join queries are so difficult to execute efficiently. With this fact table, even a restrictive join predicate between fact and dimension tables result in unwieldy answer sets. A typical fact table may easily include one billion rows. Thus, with this fact table, even a restrictive join predicate that yields one-thousandth of the fact table's rows would still yield an answer set with one million rows.

Engineers and scientists have developed a number of different approaches to address the difficulties of star/join queries. One approach is the "Cartesian product" technique, which is employed by the DB2 database product of International Business Machines Corp. This technique applies the query to the dimension tables by taking their Cartesian product, and then applies this result to the fact table using composite indexes matching the join columns of the fact table. Query execution, though, can still be lengthy if the dimension table predicates are not sufficiently restrictive due to the large size of the Cartesian product of the dimension tables.

Another known approach to optimize star/join queries is the "bit map index" technique. This technique creates one bit map index for each fact table column that is joined with a dimension table column. Bit map index entries corresponding to qualifying dimension table join column values are OR-ed together within each dimension, and the results from each dimension are then AND-ed. Rows from the fact table identified by the final bit vector can then be accessed. This approach is described in O'Neil et al., Multi-Table Joins Through Bitmapped Join Indices, SIGMOD Record, Vol. 24, No. 3, September 1995.

Although query optimizing techniques such as these constitute a significant advance and enjoy widespread use today, International Business Machines Corp. has continually sought to improve the performance and efficiency of query optimizing techniques. Chiefly, improvement is still sought in the area of query optimization and execution speed.

SUMMARY OF THE INVENTION

Broadly, the present invention concerns the efficient evaluation and execution of star/join type queries. A query is received and then analyzed to determined whether it is suitable for optimization according to the invention. Suitable queries include star/join queries with a large fact table joined with multiple subsidiary dimension tables. Also, indices over fact table join columns are required. If deemed suitable, the query is further analyzed to prepare a query plan for the dimension table accesses. The query plan is supplemented by adding nested loop join operations, where the outer table is a dimension table access plan and the inner table is an index scan performed over a fact table index of the join column(s) with the dimension table. Record references or record IDs resulting from the nested loop joins are filtered using a sequence of dynamic bit vectors, ultimately yielding a list of probable fact table record references.

The probable fact table records can then be accessed to form a distilled fact table. The distilled fact table is then used in place of the original fact table to construct a supplemental execution plan for the entire star/join query. The estimated execution cost of the supplemental execution plan is compared to estimated costs of alternative query execution plans. Alternatively, the supplemental execution plan may be executed straight away, if a companion to other plans is unavailable or undesired.

In one embodiment, the invention may be implemented to provide a method to plan and/or execute a star/join type query. In another embodiment, the invention may be implemented to provide an apparatus, such as a digital data processing machine, suitable to plan and/or execute a star/join type query. In still another embodiment, the invention may be implemented to provide a signal-bearing medium tangibly embodying a program of machine-readable instructions executable by a digital data processing apparatus to perform method steps to plan and/or execute a star/join type query.

The invention affords its users with a number of distinct advantages. Chiefly, the invention performs star/join queries more rapidly than other approaches,. The invention also provides a number of other advantages and benefits, which should be apparent from the following description of the invention.

BRIEF DESCRIPTION OF THE DRAWINGS

The nature, objects, and advantages of the invention will became more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE COMPONENTS & INTERCONNECTIONS

Figure 2:
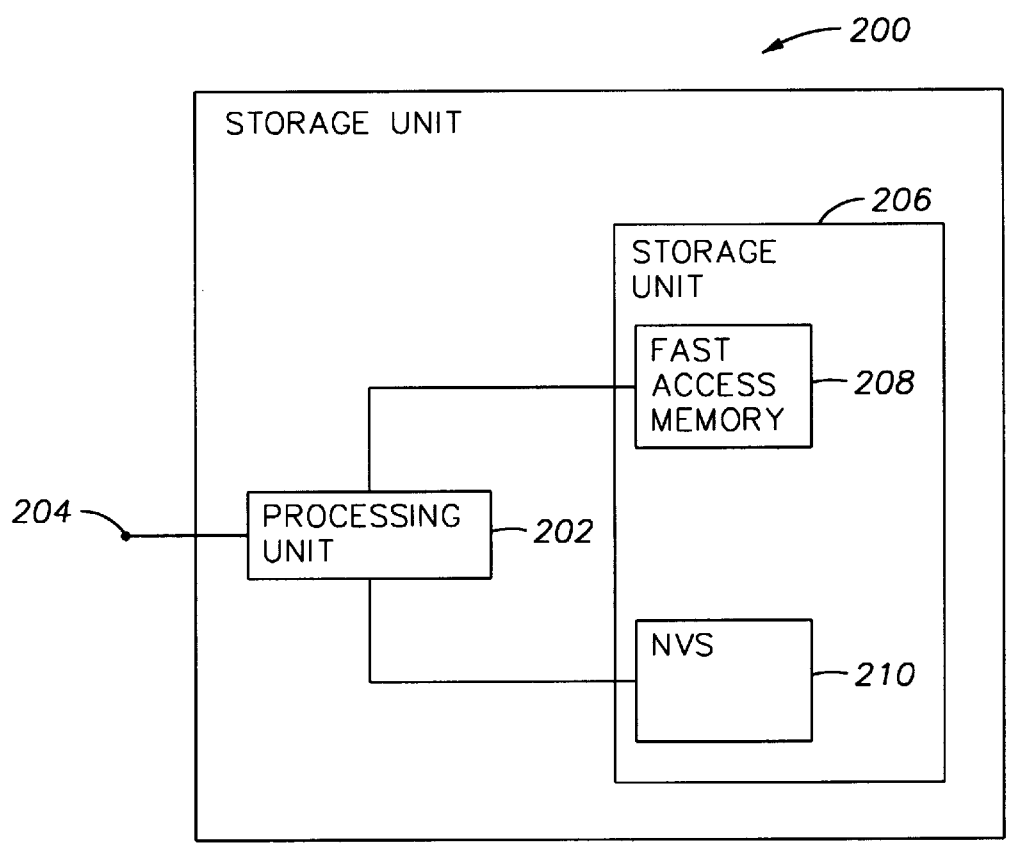
FIG. 2 is a block diagram of a digital data processing machine in accordance with the invention.

One aspect of the invention concerns a digital data processing apparatus, which may be embodied by various hardware components and interconnections. FIG. 2 shows an example of one digital data processing apparatus 200. The apparatus 200 includes a processing unit 202, such as a microprocessor or other processing machine, coupled to a storage unit 206. In the present example, the storage unit 206 includes a fast-access memory 208 and nonvolatile storage 210. The fast-access memory 208 preferably comprises high speed memory circuitry such as random access memory, and may be used to store the programming instructions executed by the processing unit 202. The nonvolatile storage 210 may comprise, for example, DASD (e.g., one or more magnetic data storage disks such as a "hard drive", floppy disk, or RAID array), magnetic tape, electronic read-only memory (e.g., ROM, EPROM, or EEPROM), optical storage (e.g., optical tape, WORM, CD-ROM, DVD), paper "punch" cards, or another suitable signal-bearing medium including transmission media such as digital analog, communication links, or wireless media. The apparatus 200 also includes an input/output 204, such as a line, bus, cable, electromagnetic link, fiber optic link, or other means to exchange data with the processing unit 202.

Despite the specific foregoing description, ordinarily skilled artisans (having the benefit of this disclosure) will recognize that the apparatus 200 may be still implemented in a machine of different construction, without departing from the scope of the invention. As a specific example, one of the components 208/210 may be eliminated; furthermore, the storage unit 206 may be provided on-board the processing unit 202, or even provided externally to the apparatus 200. As a specific example, the apparatus 200 may be embodied by a high-power computer such as an IBM RS/6000 machine.

OPERATION

In addition to the various hardware embodiments described above, a different aspect of the invention concerns a method for optimizing a database query using a digital data processing machine such as the apparatus 200.

Signal-Bearing Media

Such a method may be implemented, for example, by operating the processing unit 202 to execute a sequence of machine-readable instructions. These instructions may reside in various types of signal-bearing media. In this respect, one aspect of the present invention concerns an article of manufacture or "programmed product", comprising signal-bearing media tangibly embodying a program of machine-readable instructions executable by a digital data processing machine to perform a method to plan and/or execute database queries.

Figure 3:
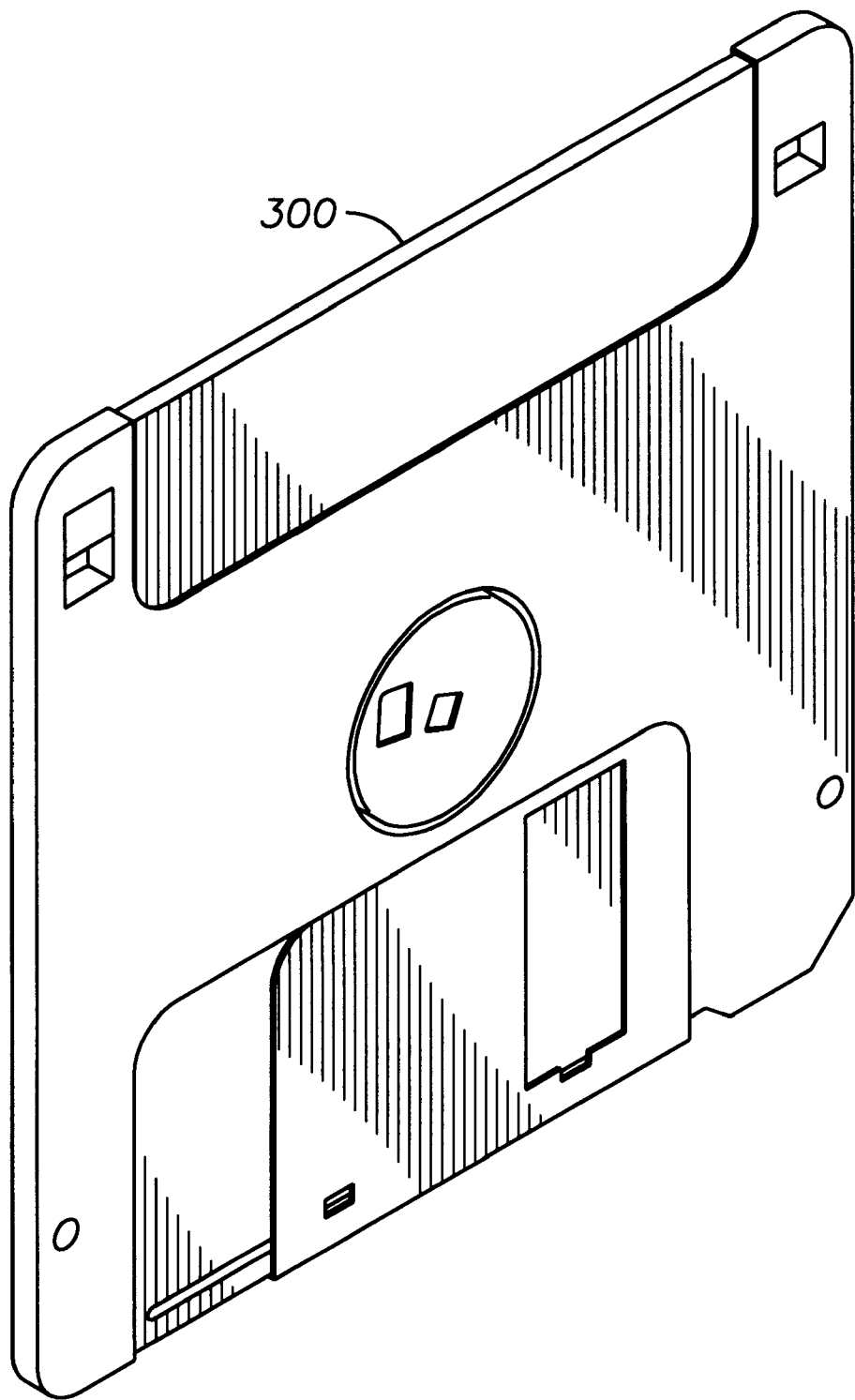
FIG. 3 is a perspective view of an exemplary signal-bearing medium in accordance with the invention.

This signal-bearing media may comprise, for example, RAI4 or other memory embodied by the fast access memory 208. Alternatively, the instructions may be contained in another signal-bearing media, such as a magnetic data storage diskette 300 (FIG. 3), directly or indirectly accessible by the processing unit 202. Whether contained in the apparatus 200, a separate signal-bearing media, or elsewhere, the instructions may be stored on a variety of machine-readable data storage media, such as DALSD storage (e.g., a conventional "hard drive", floppy disk, or a RAID array), magnetic tape, electronic read-only memory (e.g., ROM, EPROM, or EEPROM), an optical storage device (e.g. WORM, CD-ROM, DVD, optical tape), paper "punch" cards, or other suitable signal-bearing media including transmission media such as digital and analog and communication links and wireless. In an illustrative embodiment of the invention, the machine-readable instructions may comprise lines of compiled PLX and C++ language code.

Overall Sequence of Operation

Figure 4:
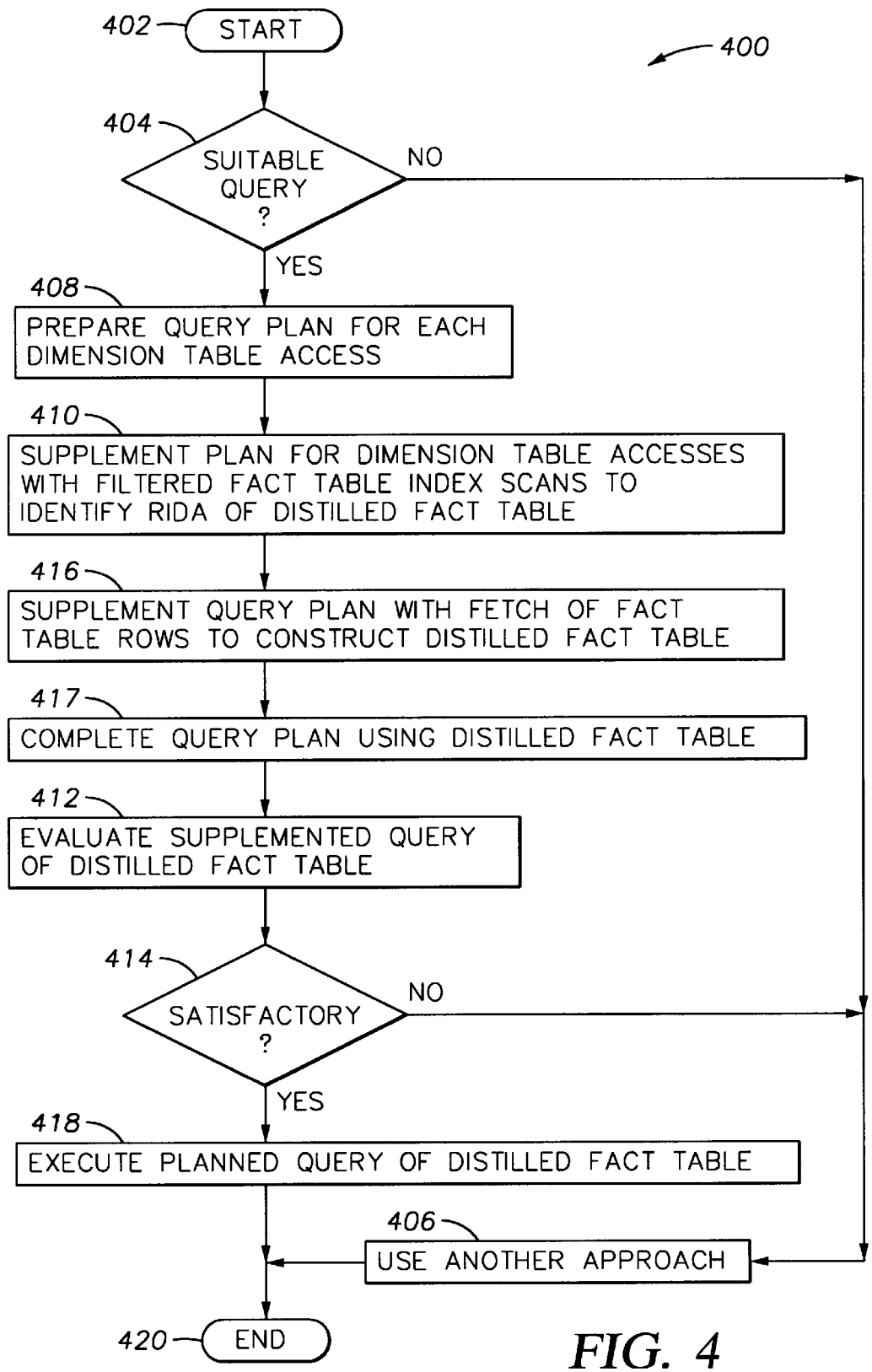
FIG. 4 is a flowchart of an operational sequence for star/join query optimization in accordance with the invention.

FIG. 4 shows a sequence of method steps 400 to illustrate one example of the method aspect of the present invention. For ease of explanation, but without any limitation intended thereby, the example of FIG. 4 is described in the context of the digital data processing apparatus 200 described above. Generally, the routine 40(0 constructs a plan for executing a star/join query, compares the plan to certain criteria, and executes the plan if it satisfies the criteria.

Query Analysis

Figure 1:
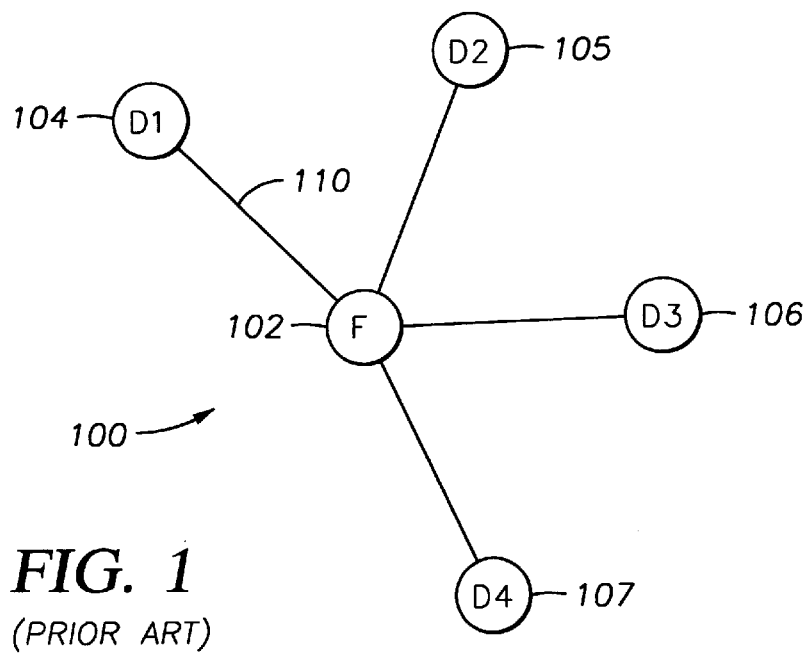
FIG. 1 is a graphical representation of a typical star/join query.

The routine 400 commences in step 402, which receives a query to be optimized. In the present example, the received query is the query 100 (FIG. 1).

Step 404 analyzes the query by applying certain predetermined criteria to the query. This is performed to determine whether this query it is a suitable candidate for optimization according to this process. In one embodiment, suitable queries must have the following characteristics:

1. The query involves an extremely large fact table, such as one million or one billion rows; although smaller fact tables may be used, the invention is most efficient with fact tables of possibly unwieldy size.
2. The query involves multiple dimension table joins.
3. An index exists on each column of the fact table being joined with a dimension table.
4. The cardinality of the dimension table is reduced after applying local predicates to the dimension table.

Optionally, in determining a suitable query step 404 may ignore parts of a query lacking the desired characteristics. For example, step 404 may ignore any dimension table joins that do not reduce the fact table's size. However, it is contemplated that "snowflake" dimensions, which are query table constructs where the dimension table is joined with other tables separate from the fact table, should be allowable. Furthermore, if the required indices are not provided, the time required to generate them may be estimated and this time included in the time of the overall query plan being constructed in steps 408, 410, 416, 417, and 412.

In the present example, step 404 finds that the query 100 is suitable for optimization according to the invention. In this example, the fact table 102 includes a plurality of rows, each row being uniquely identified by a numeric, alphabetic, or alphanumeric code called a row ID (RID).

Query Plan: Dimension Table Accesses

After step 404 finds that the query is desirable for optimization according to this technique, step 408 prepares query plans for performing each "dimension table access". "Dimension table accesses" include any auxiliary joins between the dimension table and tables other than the fact table (i.e., "snowflakes"). As an example, the dimension table query plans may be implemented as taught by Selinger et al., "Access path Selection in a Relational Database Management System", Proceedings of the ACM SIGMOD Conference, June 1979. The Selinger reference is hereby incorporated by reference in its entirety.

Optionally, step 408 may limit its query plan to produce distinct join column values, eliminating any duplicates. In addition, step 408 also preferably suppresses columns of the dimension table other than the join column(s) to the fact table, using an operation such as "select".

Supplementing Query Plan: "RID" Boiling

After planning the dimension table accesses in step 408, step 410 supplements these plans to identify RIDs of a "distilled" fact table. This process is called staged comparative RID filtering. As explained in greater detail below, the distilled fact table is considerably smaller than the original fact table since it omits records that are irrelevant to the search. This step of supplementing the query plan to eliminate irrelevant RIDs is therefore known as "RID boiling". Accordingly, the original query can be performed substantially faster using the distilled fact table rather than the unwieldy original table.

Nested Loop Join

Figure 5:
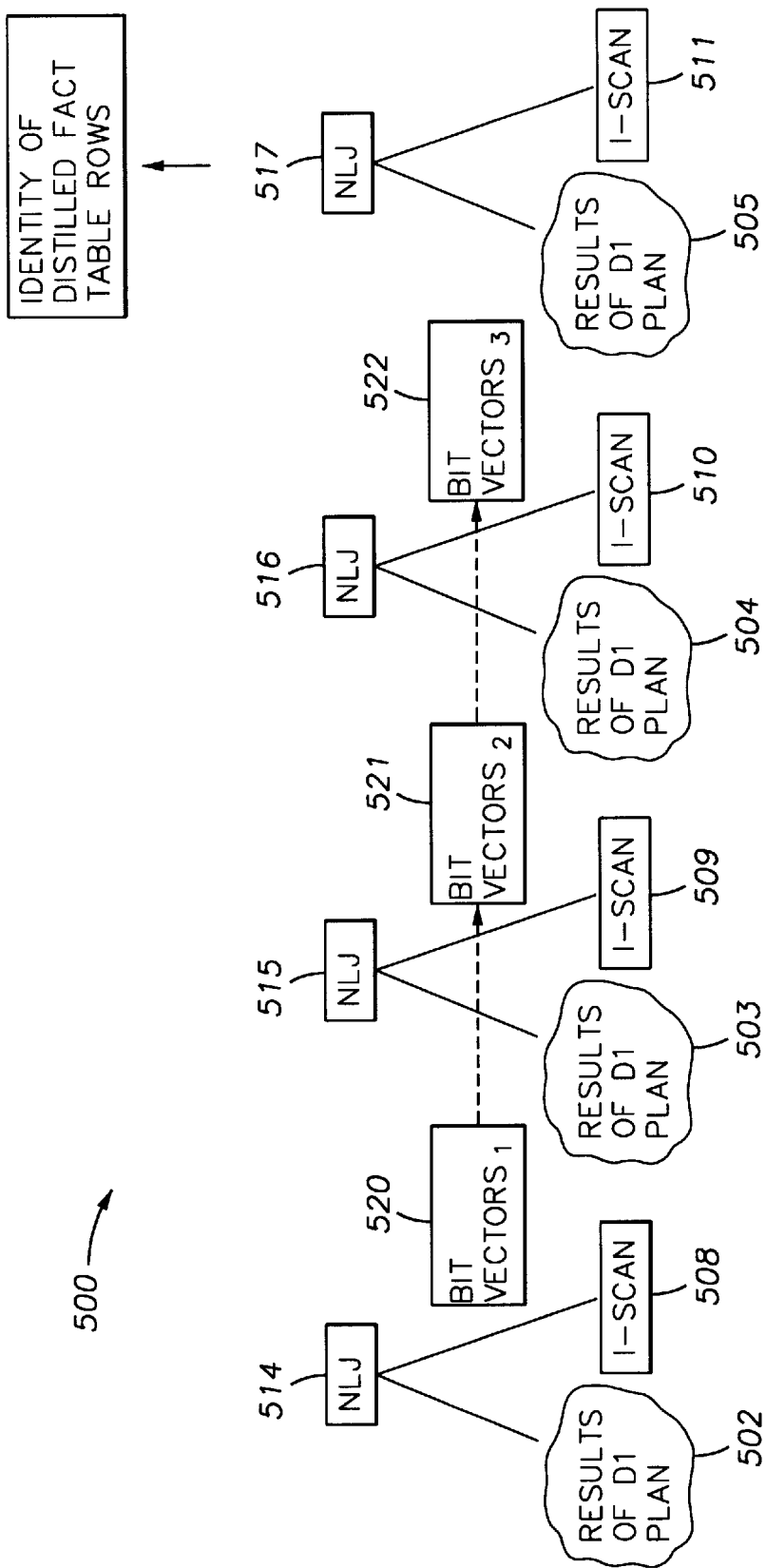
FIG. 5 is a block diagram of a query optimization plan according to the invention.
Figure 6:
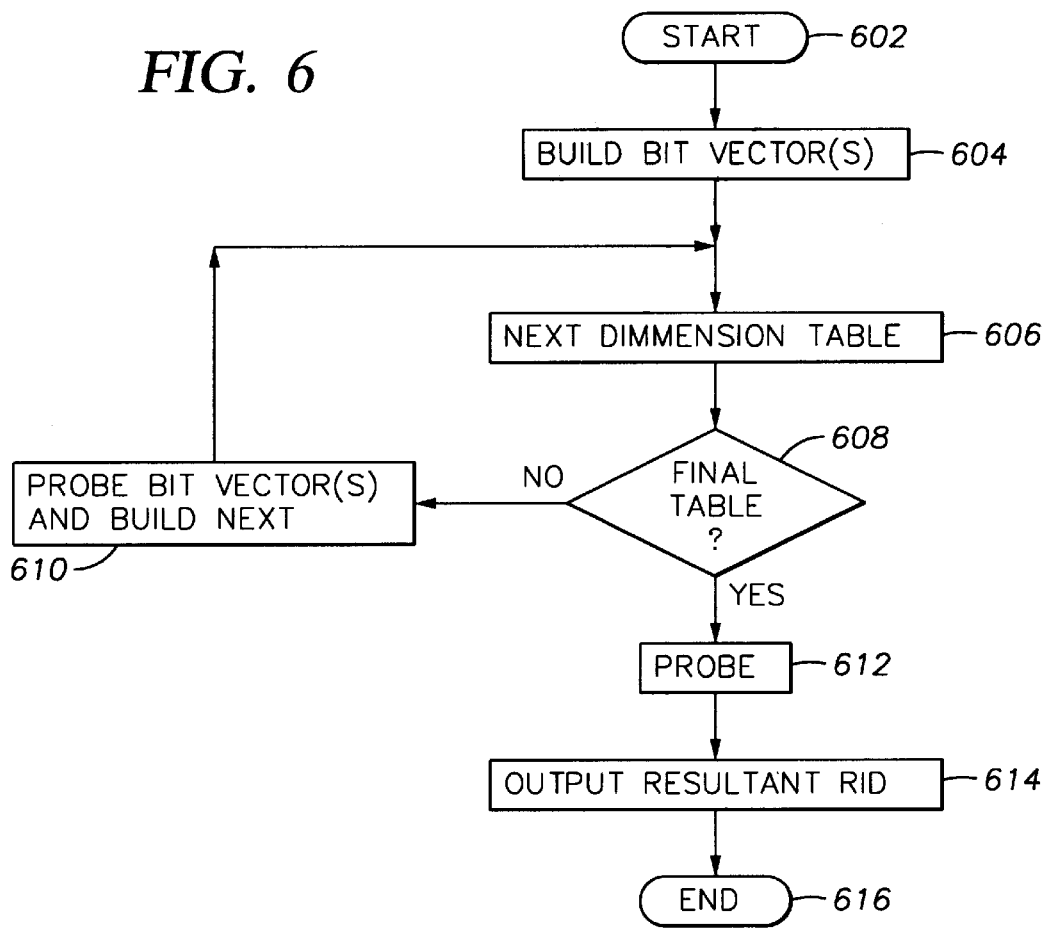
FIG. 6 is a flowchart illustrating RID filtering according to the invention.

FIGS. 5–6 help illustrate the performance of step 410 in greater detail. FIG. 5 diagrams the generation of a supplemental query plan 500 for the query 100 of FIG. 1. Preferably, the plan 500 only includes the dimension table accesses that join to less than all rows of the fact table. Other dimension table operations may be ignored at this stage. In the present example, the query of each dimension table 104–107 reduces the cardinality of the fact table; thus, the plan 500 includes query plans 502–505 corresponding to all four dimension tables.

For each dimension table, a corresponding "index scan" operation is performed. The index scans are shown by I-SCANs 508–511. More particularly, an index over the particular fact table column queried against the dimension table is scanned for the value(s) of the join column(s) of the dimension table. Using the exemplary query of FIG. 1 and Table 1, the index scan 508 searches an index over the "DIM1" column in the fact table for entries containing the value(s) of "K1" from dimension table D1. An example of this index is shown in Table 2, below.

TABLE 2

Exemplary Index

| Fact Table RID | DIM1 value |
|---|---|
| 0001 | Arizona |
| 0002 | California |
| 0003 | Texas |
| 0004 | Texas |
| . | . |
| . | . |
| . | . |
| 9761 | New Jersey |

The result of this index scan is a listing of RIDs identifying fact table rows satisfying the index scan. For the example of Table 1 and FIG. 1, the index scan results list all RIDs corresponding to fact table rows whose DIM1 column contains "New Jersey".

Each index scan operation may also be referred to a "nested loop join". The nested loop joins are shown by 514–517. Each nested loop join effectively "joins" an "outer table" (the dimension table query) with an "inner table" (the fact table index). The results of each nested loop join is a listing of fact table RIDs, which may itself be viewed as a table.

Staged Comparative RID Filtering

The RIDs resulting from the nested loop joins 514–517 are fed to a series of "dynamic bit vectors", which complete the RID boiling process. Generally, the RIDs from a first nested loop join operation are used to "build" a first set of one or more RID bit vectors. Then, the RIDs from each subsequent nested loop join operation are used to generate bit vectors that are filtered by the previous bit vector(s). This process continues until reaching the final nested loop join 517, whose resultant RIDs are evaluated to determine whether they are represented in the previous bit vector(s).

Figure 7:
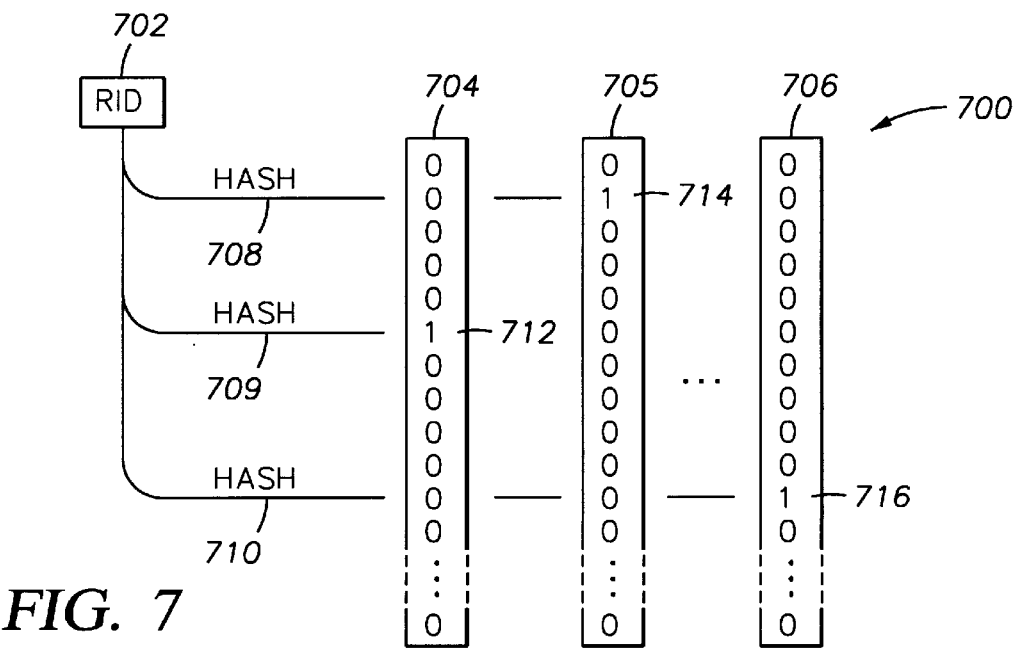
FIG. 7 is a block diagram of an illustrative supplemental query plan according to the invention.

This process is shown more thoroughly in FIGS. 6-7. FIG. 6 shows a sequence 600 for RID filtering according to the invention. After the routine 600 begins in step 602, step 604 builds one or more bit vectors from the RIDs of one of the nested loop joins 514–517. As discussed below, step 604 preferably starts with the nested loop join 514–517 having the least number of resultant RIDs. In the illustrated example, this is the nested loop join 514.

As shown in FIGS. 5–7, step 604 utilizes each resultant RID of the nested loop join 514 to select a bit in each of one or more bit vectors. Each bit vector comprises a single column of multiple binary values, all initially set to zero. The length of the bit vectors is set in proportion to the number of expected RIDs from the corresponding nested loop join operation.

In the example of FIG. 7, three bit vectors 704–706 are shown, each bit vector corresponding exclusively to a particular hash function, each of the hash functions necessarily being independent of each other. All bit vectors 704–706 have the same length, which is selected in advance to accommodate the expected number of necessary RID values.

The exemplary RID 702 is hashed with first, second, and third hash functions 708–710, which select bits from the first, second, and third bit vectors 704–706, respectively. More particularly, each hashing of the RID 702 identifies a bit in the corresponding bit vector that should be "set" to binary one. For instance, applying the hash function 708 to the RID 702 determines that a bit 714 of the bit vector 705 should be set to binary one. Similarly, applying the hash function 709 to the RID 702 determines that a bit 712 of the bit vector 704 should be set. Likewise, applying the hash function 710 to the RID 702 determines that a bit 716 of the bit vector 704 should be set.

The bit vectors resulting from the first nested loop join 514 are represented by 520. If hashing of a RID from a subsequent nested loop join finds a binary "one" already set in each bit vector, the fact table row corresponding to the RID might be relevant to the overall query. RIDs that hash to a zero bit in one or more bit vectors 704–706, however, definitely represent rows of the fact table not pertinent to the overall query. RID boiling therefore represents a process of exclusion.

Preferably, each hash function is a member of a set of "universal" hash functions, meaning that their output values are evenly distributed and also completely independent of the output values of the other hash functions. Thus, the results of each hash function 708–710 is preferably independent of the others. One example of a suitable hash function is discussed in greater detail in J. L. Carter et al., "Universal Classes of Hash Functions", *Journal of Computer and System Sciences*, Vol. 18, No. 2 (April 1979), pp. 143–154, which is hereby incorporated by reference in its entirety. As an example, hashing of a RID may set a bit whose position is given according to Equation 1, below.

$$\text{bit position} = \text{hash(RID)} \text{ \% (bit vector size)} \quad [1]$$

where: hash(RID): represents a numerical term resulting from application of the hash function;

bit vector size: is the number of bits in the bit vector; and

%: represents the mathematical modulo operation, i.e., x % y=remainder (x/y).

Referring to FIGS. 5–7, after the first set of bit vectors 520 is built in step 604, step 606 proceeds to the next dimension table plan. This is the plan 503 in the present example. Preferably, step 604 starts with the dimension table nested loop join having the smallest number of matching fact table rows, and step 606 sequentially advances to dimension tables with larger and larger join cardinalities. Thus, the example of FIG. 5 is preferred when the nested loop join 514 produces the fewest RIDs, with the operations 515, 516, and 517 producing successively greater numbers of RIDs.

Step 608 then asks whether this is the final dimension table to be processed. In the present example, where the dimension table plans are processed from left to right, the final dimension query plan to be processed is the plan 505. As alternative, step 608 may consider the number of bits set in the just-completed bit vectors and declare the next dimension table to be the "final" table if the number of bits is below a predetermined threshold. If step 608 finds that the current plan is not the final, step 610 performs a "probe and build" operation. Specifically, step 608 builds a set of new bit vectors (not shown) by processing resultant RIDs of the current dimension table according to FIG. 7. Each RID is hashed using the same hash functions 708–710. The bit positions corresponding to the hash function output in the old bit vectors are then checked. This constitutes a "probe" operation. Then, if all the checked bit positions are set to one for the current RID, the corresponding bit positions in the new bit vectors are set to one; this constitutes a "build" operation.

Later, when step 608 arrives at the last dimension table, step 612 performs a probe operation for each RID from this last dimension table join. The RIDs that pass the probe operation represent rows of a fact table that has been distilled by removing rows irrelevant to the present query. In the illustrated example, the last dimension table plan is 505, which is associated with the nested loop join 517. The probe operation of step 612 separately evaluates each RID resulting from the nested loop join 517. Each RID is hashed by the same three hash functions used to process the other dimension tables. If the bits indicated by the hash functions are all set in the corresponding bit vectors from the previous dimension table plan, the fact table row corresponding to the RID still might be relevant to the overall query. Using the illustrated example, each RID from the nested loop join 517 is hashed three times to identify bits from the bit vector 522; if these bits are already set, this RID is potentially relevant to the overall query. RIDs that yield a zero in one or more bit vectors, however, definitely represent rows of the fact table not pertinent to the overall query.

After probing all RIDs of the nested loop join 517, the surviving RIDs are output in step 614. Alternatively, if desired, RIDs may be probed and output individually. After step 614, the routine 600 ends in step 616.

A similar problem to RID filtering, "set intersection filtering", is discussed in the following reference, the entirety of which is hereby incorporated by reference: B. H. Bloom, "Space/Time Trade-Offs in Hash Coding with Allowable Errors", *Comm. ACM* 13, 7 (July 1970), pp. 422–426.

Fetching Fact Table Rows

After step 410 prepares the supplemental query plan, step 416 further supplements the query plan by planning a fetch of the fact table rows identified by the "boiled" RIDs of step 410. Preferably, these rows are assembled in memory, such as the memory 208, to actually construct a distilled fact table. Alternatively, the identified row,; may be fetched into a non-table structure, or even identified in-place without fetching. As described below, the supplemented query plan is subsequently executed upon the identified rows, whether located in the distilled fact table, another data structure, or specified locations of the original fact table.

As an optional enhancement, step 416 may also sort the fact table RIDs before fetching fact table rows to improve execution of the query. For instance. the rows may be sorted numerically according to their RIDs. This sorting would therefore group nearby rows, thereby streamlining the subsequent fetching of fact table rows.

Completing Query Plan

After step 416, step 417 completes the original star/join query plan by joining the distilled fact table with all the dimension tables. If desired, known query optimization techniques can be used to determine the best query execution plan for the star/join query given the distilled fact table. Such techniques include, for example, those of Selinger et al., referenced above.

Evaluating Supplemented Query Plan

After step 417 completes the supplemented query plan, step 412 evaluates the execution of this plan upon the distilled fact table. The supplemented plan is evaluated against certain predetermined criteria, which are selected depending upon the particular implementation needs.

Preferably, the execution time of the supplemented plan is evaluated by comparing it to the execution time of one or more alternative plans. As an alternative, the supplemented plan may be evaluated by comparing it to a desired execution time. Regardless of the evaluation used, if the supplemented query plan is not satisfactory according to the criteria of step 412, then step 414 advances to step 406, which executes the query using a different approach. After step 406, the routine ends in step 420.

Executing Planned Query Using Distilled Fact Table

If step 414 finds the supplemental query plan satisfactory, step 418 executes the planned supplemented query upon the table rows collected or otherwise identified in step 416. This step includes any dimension table accesses that were ignored in creating the supplemental plan 500, e.g., those dimension table accesses failing to reduce the cardinality of the fact table. This query executes with considerable speed because it is performed on the distilled table rather than the substantially larger original table. After executing the query in step 418, the routine 400 ends in step 420.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for planning a database query, comprising:
   receiving a star/join query joining a fact table with multiple dimension tables, said fact table including a plurality of rows each row identified by a row identification code (RID);
   forming a first query plan for access of each dimension table to identify resultant rows of each dimension table;
   forming a second query plan for access of the fact table, comprising the steps of:
     for the resultant rows of each dimension table, planning a fact table index scan over join columns of that dimension table to produce a set of resultant RIDs, said fact table having indices for join columns with each of the dimension tables;
     applying staged comparative RID filtering to each dimension table's set of resultant RIDs to produce a set of filtered RIDs; and
     planning a fetch of all fact table rows corresponding to the set of filtered RIDs to produce a distilled fact table; and
   forming a final query plan comprising planning execution of the query using the distilled fact table.

2. The method of claim 1, further comprising:
   predicting an execution cost required to perform the first, second, and final query plans.

3. The method of claim 2, further comprising:
   determining whether the cost satisfies a predetermined criteria, and if so, carrying out the planned first, second, and final queries.

4. The method of claim 3, further comprising:
   predicting an execution cost to perform one or more alternate query plans;
   wherein the predetermined criteria comprises the cost of the first, second, and final query plans being less than each of the alternate query plans.

5. The method of claim 1, further comprising:
   executing the first, second, and final query plans.

6. The method of claim 1, the receiving step comprising:
   receiving a query; and
   analyzing the query to determine whether the query comprises a star/join query joining a fact table with multiple dimension tables, and if not, aborting further operations.

7. The method of claim 6, the analyzing step comprising:
   analyzing the query to determine whether the fact table lacks indices for join columns with any of the dimension tables, and if so excluding said dimension tables from the first and second query plans.

8. The method of claims 6, the analyzing step comprising:
   analyzing the query to determine whether the join between any dimension table and the fact table reduces cardinality of the fact table, and if not, excluding said dimension tables from the first and second query plans.

9. The method of claim 1, further comprising:
   analyzing the query to determine whether the fact table includes indices for join columns with each of the dimension tables, and if not, supplementing the second query plan to include planning generation of said indices.

10. The method of claim 1, the receiving further comprising:
    identifying within the star/join query a snowflake join comprising a join of a first one of the dimension tables with another table that is neither the fact table nor one of the dimension tables; and
    the forming of the first query plan including the snowflake join.

11. The method of claim 10, the forming of the first query plan only including the snowflake join if the snowflake join reduces cardinality of the first dimension table.

12. The method of claim 1, the first query plan being constructed to produce distinct join column values.

13. The method of claim 1, the first query plan suppressing columns of the dimension tables other than the join columns.

14. The method of claim 1, the fact table index scan of each dimension table comprising a nested loop join operation performed upon an inner table and an outer table, the outer table comprising the plan for executing query of the dimension table, the inner table comprising an index over one or more join columns of table.

15. The method of claim 1, the forming of the second query plan further comprising:
    estimating a cardinality of each set of resultant RIDs of each dimension table join to the fact table index; and
    the applying of stage comparative ridge filtering being performed in order from least to greatest number of the estimated cardinality.

16. A method for performing a database query, comprising:
    receiving a star/join query joining a fact table with multiple dimension tables, said fact table including a plurality of rows each row identified by a row identification code (RID);
    performing access of each dimension table according to the star/join query to identify resultant rows of each dimension table; and
    for the resultant rows of each dimension table, performing a fact table index scan over join columns of that dimension table to produce a set of resultant RIDs, said fact table having indices for join columns with each of the dimension tables;

applying staged comparative RID filtering to each dimension table's set of resultant RIDs to produce a set of filtered RIDs;

fetching all fact table rows corresponding to the set of filtered RIDs to produce a distilled fact table; and executing the star/join query using the distilled fact table.

17. The method of claim 16, the receiving step comprising:

receiving a query; and analyzing the query to determine whether the query comprises a star/join query joining a fact table with multiple dimension tables, and if not, aborting further operations.

18. The method of claim 17, the analyzing step comprising:

analyzing the query to determine whether the fact table lacks indices for join columns with any of the dimension tables, and if so, excluding said dimension tables from the performing access, performing the fact table index scan, applying, and fetching steps.

19. The method of claim 16, further comprising:

analyzing the query to determine whether the fact table includes indices for join columns with each of the dimension tables, and if not, supplementing the second query plan to include planning generation of said indices.

20. The method of claim 16, the receiving further comprising:

identifying within the star/join query a snowflake join comprising, a join of a first one of the dimension tables with another table that is neither the fact table nor one of the dimension tables; and the performing access of each dimension table including performing each snowflake join.

21. The method of claim 20, the performing access of each dimension table only including the snowflake join if the snowflake join reduces cardinality of the first dimension table.

22. The method of claim 16, the access of each dimension table being executed so as to produce distinct join column values.

23. The method of claim 16, the access of each dimension table suppressing columns of the dimension tables other than the join columns.

24. The method of claim 16, the fact table index scan of each dimension table comprising a nested loop join operation performed upon an inner table and an outer table, the outer table comprising the plan for executing query of the dimension table, the inner table comprising an index over one or more join columns of the fact table.

25. The method of claim 16, the applying of staged comparative RID filtering employing a set of one or more dynamic bit vectors for each dimension table, the filtering being performed in order from smallest to largest of the dynamic bit vectors.

26. A signal-bearing medium tangibly embodying a program of machine-readable instructions executable by a digital processing apparatus to perform a method for planning a database query, said method comprising:

receiving a star/join query joining a fact table with multiple dimension tables, said fact table including a plurality of rows each row identified by a row identification code (RID);

forming a first query plan for access of each dimension table to identify resultant rows of each dimension table;

forming a second query plan for access of the fact table, comprising the steps of:

for the resultant rows of each dimension table, planning a fact table index scan over join columns of that dimension table to produce a set of resultant RIDs, said fact table having indices for join columns with each of the dimension tables;

applying staged comparative RID filtering to each dimension table's set of resultant RIDs to produce a set of filtered RIDs; and planning a fetch of all fact table rows corresponding to the set of filtered RIDs to produce a distilled fact table; and forming a final query plan comprising planning execution of the query using the distilled fact table.

27. The medium of claim 26, further comprising:

predicting an execution cost required to perform the first, second, and final query plans.

28. The medium of claim 27, further comprising:

determining whether the cost satisfies a predetermined criteria, and if so, carrying out the planned first, second, and final queries.

29. The medium of claim 28, further comprising:

predicting an execution cost to perform one or more alternate query plans;

wherein the predetermined criteria comprises the cost of the first, second, and final query plans being less than each of the alternate query plans.

30. The medium of claim 26, further comprising:

executing the first, second, and final query plans.

31. The medium of claim 26, the receiving step comprising:

receiving a query; and analyzing the query to determine whether the query comprises a star/join query joining a fact table with multiple dimension tables, and if not, aborting further operations.

32. The medium of claim 31, the analyzing step comprising:

analyzing the query to determine whether the fact table lacks indices for join columns with any of the dimension tables, and if excluding said dimension tables from the first and second query plans.

33. The medium of claims 31, the analyzing step comprising:

analyzing the query to determine whether the join between any dimension table and the fact table reduces cardinality of the fact table, and if not, excluding said dimension tables from the first and second query plans.

34. The medium of claim 26, further comprising:

analyzing the query to determine whether the fact table includes indices for join columns with each of the dimension tables, and if not, supplementing the second query plan to include planning generation of said indices.

35. The medium of claim 26, the receiving further comprising:

identifying within the star/join query a snowflake join comprising a join of a first one of the dimension tables with another table that is neither the fact table nor one of the dimension tables; and the forming of the first query plan including the snowflake join.

36. The medium of claim 35, the forming of the first query plan only including the snowflake join if the snowflake join reduces cardinality of the first dimension table.

37. The medium of claim 26, the first query plan being constructed to produce distinct join column values.

38. The medium of claim 26, the first query plan suppressing columns of the dimension tables other than the join columns.

39. The medium of claim 26, the fact table index scan of each dimension table comprising a nested loop join operation performed upon an inner table and an outer table, the outer table comprising the plan for executing query of the dimension table, the inner table comprising an index over one or more join columns of the fact table.

40. The medium of claim 26, the forming of the second query plan further comprising:
  estimating a cardinality of each set of resultant RIDs of each dimension table join to the fact table index; and
  the applying of stage comparative ridge filtering being performed in order from least to greatest number of the estimated cardinality.

41. A signal-bearing medium tangibly embodying a program of machine-readable instructions executable by a digital processing apparatus to perform a database query, said method comprising:
  receiving a star/join query joining a fact table with multiple dimension tables, said fact table including a plurality of rows each row identified by a row identification code (RID);
  performing access of each dimension table according to the star/join query to identify resultant rows of each dimension table; and
  for the resultant rows of each dimension table, performing a fact table index scan over join columns of that dimension table to produce a set of resultant RIDs, said fact table having indices for join columns with each of the dimension tables;
  applying staged comparative RID filtering to each dimension table's set of resultant RIDs to produce a set of filtered RIDs;
  fetching all fact table rows corresponding to the set of filtered RIDs to produce a distilled fact table; and
  executing the star/join query using the distilled fact table.

42. The medium of claim 41, the receiving step comprising:
  receiving a query; and
  analyzing the query to determine whether the query comprises a star/join query joining a fact table with multiple dimension tables, and if not, aborting further operations.

43. The medium of claim 42, the analyzing step comprising:
  analyzing the query to determine whether the fact table lacks indices for join columns with any of the dimension tables, and if so excluding said dimension tables from the performing access, performing the fact table index scan, applying, and fetching steps.

44. The medium of claim 41, further comprising:
  analyzing the query to determine whether the fact table includes indices for join columns with each of the dimension tables, and if not, supplementing the second query plan to include planning generation of said indices.

45. The medium of claim 41, the receiving further comprising:
  identifying within the star/join query a snowflake join comprising a join of a first one of the dimension tables with another table that is neither the fact table nor one of the dimension tables; and
  the performing access of each dimension table including performing each snowflake join.

46. The medium of claim 45, the performing access of each dimension table only including the snowflake join if the snowflake join reduces cardinality of the first dimension table.

47. The medium of claim 41, the access of each dimension table being executed so as to produce distinct join column values.

48. The medium of claim 41, the access of each dimension table suppressing columns of the dimension tables other than the join columns.

49. The medium of claim 41, the fact table index scan of each dimension table comprising a nested loop join operation performed upon an inner table and an outer table, the outer table comprising the plan for executing query of the dimension table, the inner table comprising an index over one or more join columns of the fact table.

50. The medium of claim 41, the applying of staged comparative RID filtering employing a set of one or more dynamic bit vectors for each dimension table, the filtering being performed in order from smallest to largest of the dynamic bit vectors.

51. A digital data processing apparatus, comprising:
  a storage unit containing a program of machine-readable instructions; and
  a processing unit coupled to the storage unit and being programmed to perform steps to evaluate a query by executing the machine-readable instructions, said steps comprising:
    receiving a star/join query joining a fact table with multiple dimension tables, said fact table including a plurality of rows each row identified by a row identification code (RID);
    forming a first query plan for access of each dimension table to identify resultant rows of each dimension table;
    forming a second query plan for access of the fact table, comprising the steps of:
      for the resultant rows of each dimension table, planning a fact table index scan over join columns of that dimension table to produce a set of resultant RIDs, said fact table having indices for join columns with each of the dimension tables;
      applying staged comparative RID filtering to each dimension table's set of resultant RIDs to produce a set of filtered RIDs; and
      planning a fetch of all fact table rows corresponding to the set of filtered RIDs to produce a distilled fact table; and
    forming a final query plan comprising planning execution of the query using the distilled fact table.

52. The apparatus of claim 51, further comprising:
  predicting an execution cost required to perform the first, second, and final query plans.

53. The apparatus of claim 52, further comprising:
  determining whether the cost satisfies a predetermined criteria, and if so, carrying out the planned first, second, and final queries.

54. The apparatus of claim 53, further comprising:
  predicting an execution cost to perform one or more alternate query plans;

wherein the predetermined criteria comprises the cost of the first, second, and final query plans being less than each of the alternate query plans.

55. The apparatus of claim 51, further comprising:
executing the first, second, and final query plans.

56. The apparatus of claim 51, the receiving step comprising:
receiving a query; and
analyzing the query to determine whether the query comprises a star/join query joining a fact table with multiple dimension tables, and if not, aborting further operations.

57. The apparatus of claim 56, the analyzing step comprising:
analyzing the query to determine whether the fact table lacks indices for join columns with any of the dimension tables, and if so, excluding said dimension tables from the first and second query plans.

58. The apparatus of claims 56, the analyzing step comprising:
analyzing the query to determine whether the join between any dimension table and the fact table reduces cardinality of the fact table, and if not, excluding said dimension tables from the first and second query plans.

59. The apparatus of claim 51, further comprising:
analyzing the query to determine whether the fact table includes indices for join columns with each of the dimension tables, and if not, supplementing the second query plan to include planning generation of said indices.

60. The apparatus of claim 51, the receiving further comprising:
identifying within the star/join query a snowflake join comprising a join of a first one of the dimension tables with another table that is neither th. fact table nor one of the dimension tables; and
the forming of the first query plan including the snowflake join.

61. The apparatus of claim 60, the forming of the first query plan only including the snowflake join if the snowflake join reduces cardinality of the first dimension table.

62. The apparatus of claim 52, the first query plan being constructed to produce distinct join column values.

63. The apparatus of claim 52, the first query plan suppressing columns of the dimension tables other than the join columns.

64. The apparatus of claim 52, the fact table index scan of each dimension table comprising a nested loop join operation performed upon an inner table and an outer table, the outer table comprising the plan for executing query of the dimension table, the inner table comprising an index over one or more join columns of the fact table.

65. The apparatus of claim 51, the forming of the second query plan further comprising:
estimating a cardinality of each set of resultant RIDs of each dimension table join to the fact table index; and
the applying of stage comparative ridge filtering being performed in order from least to greatest number of the estimated cardinality.

66. A digital data processing apparatus, comprising:
a storage unit containing a program of machine-readable instructions; and
a processing unit coupled to the storage unit and being programed to perform a database a query by executing the machine-readable instructions, said steps comprising:
receiving a star/join query joining a fact table with multiple dimension tables, said fact table including a plurality of rows each row identified by a row identification code (RID);
performing access of each dimension table according to the star/join query to identify resultant rows of each dimension table; and
for the resultant rows of each dimension table, performing a fact table index scan over join columns of that dimension table to produce a set of resultant RIDs, said fact table having indices for join columns with each of the dimension tables;
applying staged comparative RID filtering to each dimension table's set of resultant RIDs to produce a set of filtered RIDs;
fetching all fact table rows corresponding to the set of filtered RIDs to produce a distilled fact table; and
executing the star/join query using the distilled fact table.

67. The apparatus of claim 66, the receiving step comprising:
receiving a query; and
analyzing the query to determine whether the query comprises a star/join query joining a fact table with multiple dimension tables, and if not, aborting further operations.

68. The apparatus of claim 67, the analyzing step comprising:
analyzing the query to determine whether the fact table lacks indices for join columns with any of the dimension tables, and if so, excluding said dimension tables from the performing access, performing the fact table index scan, applying, and fetching steps.

69. The apparatus of claim 66, further comprising:
analyzing the query to determine whether the fact table includes indices for join columns with each of the dimension tables, and if not, supplementing the second query plan to include planning generation of said indices.

70. The apparatus of claim 66, the receiving further comprising:
identifying within the star/join query a snowflake join comprising a join of a first one of the dimension tables with another table that is neither the fact table nor one of the dimension tables; and
the performing access of each dimension table including performing each snowflake join.

71. The apparatus of claim 70, the performing access of each dimension table only including the snowflake join if the snowflake join reduces cardinality of the first dimension table.

72. The apparatus of claim 66, the access of each dimension table being executed so as to produce distinct join column values.

73. The apparatus of claim 66, the access of each dimension table suppressing columns of the dimension tables other than the join columns.

74. The apparatus of claim 66, the fact table index scan of each dimension table comprising a nested loop join operation performed upon an inner table and an outer table, the outer table comprising the plan for executing query of the dimension table, the inner table comprising an index over one or more join columns of the fact table.

75. The apparatus of claim 66, the applying of staged comparative RID filtering employing a set of one or more dynamic bit vectors for each dimension table, the filtering being performed in order from smallest to largest of the dynamic bit vectors.

* * * * *